United States Patent [19]

Lowery

[11] 4,270,637
[45] Jun. 2, 1981

[54] ADJUSTABLE SPRING CLUTCH

[75] Inventor: Robert D. Lowery, Willowick, Ohio

[73] Assignee: Marquette Metal Products, Fountain Inn, S.C.

[21] Appl. No.: 14,865

[22] Filed: Feb. 26, 1979

[51] Int. Cl.³ .................... F16D 13/04; F16D 13/08
[52] U.S. Cl. .................. 192/41 S; 74/126; 192/81 C
[58] Field of Search ............ 192/41 S, 55, 81 C; 74/126, 164; 64/DIG. 2, 27 S, 27 CT, 27 C

[56] References Cited

U.S. PATENT DOCUMENTS

| 3,128,863 | 4/1964 | Tomko | 192/81 C |
| 3,442,359 | 5/1969 | Atchison | 192/41 S |
| 3,450,239 | 6/1969 | Ryan et al. | 192/41 S |
| 3,528,533 | 9/1970 | Sacchini | 192/41 S |
| 3,726,372 | 4/1973 | Baer et al. | 192/81 C X |

Primary Examiner—Rodney H. Bonck
Attorney, Agent, or Firm—Arthur L. Frederick

[57] ABSTRACT

This invention relates to a spring clutch having a slot circumferentially about its surface to provide for a predetermined amount of rotation of its input clutch drum relative to the output clutch drum before effecting rotation of its output clutch drum. Adjustment means is provided to vary the width of the slot and thereby permitting selective presetting of the spring clutch for a predetermined amount of intermittent angular rotation of the output clutch drum.

8 Claims, 4 Drawing Figures

ADJUSTABLE SPRING CLUTCH

BACKGROUND OF THE INVENTION

Spring clutch mechanisms are well known in the art such as disclosed in, for example, U.S. Pat. No. 3,128,863 which issued Apr. 14, 1964 To D. R. Tomko and U.S. Pat. No. 3,528,533 which issued Sept. 14, 1970 to C. R. Sacchini. The spring clutch mechanism disclosed in these patents have input drums which are rotatively driven in a selected direction and include a cross-over gap or slot between the drums for control of chatter. The cross-over gap is provided so that the over-running torque exerted on the spring coils next to the cross-over will be less than that required to cause the coil porton to contact and grip the cross-over surface. In both of these spring clutch mechanisms the input drum is continuously rotated in one selected direction, as aforementioned, and, when the spring clutch is in an engaged operative condition, the output drum is continuously rotated in that selected direction. The present invention is directed to a spring clutch mechanism, wherein both the input and output drums rotatively reciprocate a predetermined angular amount, and wherein the output clutch drum is intermittently rotated in one direction by the input clutch drum which is rotatively reciprocatively driven without reversing rotation of the output clutch drum. Such spring clutches are widely used in such areas as, for example, dispensing machines wherein a metered amount of beverage is dispensed. It has been heretofore not shown, however, how to provide for control of the width of the cross-over slot or gap which is essential to provide, during the operative life of the spring clutch, accurate angular rotation of the output drum. Reliable output rotation is disrupted by accumulation of contaminants such as dirt and oil upon the surface of the clutch which causes wear in the area of the slot or gap and thereby changes the effective width of the slot or gap. It is therefore essential that a spring clutch of the type as herein described be provided with an adjustment feature directed to convenient control of the width of the cross-over gap so that accurate angular rotation of the output clutch drum is maintainable in spite of wear. Such adjustment feature also increases the versitility of a spring clutch having intermittent angular output in that it can be field-adjusted to produce any desired degree of angular output. It is thus a principal object of the present invention to provide a coil spring clutch wherein output of the output clutch drum is conveniently and expeditiously regulated to provide for a predetermined intermittent constant angular output throughout its entire operative life.

It is another object of this invention to provide a spring clutch wherein the intermittent angular output is capable of being varied by field-adjustment of the spring clutch.

SUMMARY OF THE INVENTION

The invention, therefore, contemplates an adjustable spring clutch of the type to provide an intermittent rotative output in one direction comprising input and output drums supported for relative rotative movement on a support structure. The input and output drums are so constructed and supported as to provide an annular gap between said input and output drums. The spring clutch also includes a coil spring which is disposed coaxially of the input and output drums and spanning said gap and is connected to said input and output drums for gripping said input and output drums. An adjustable means is provided which coacts with said input and output drums for varying the amount of relative rotative movement between the input and output drums before torque is transmitted from the input drum to the output drum.

BRIEF DESCRIPTION OF THE DRAWINGS

The invention will be more fully understood from the following description when considered in connection with the accompanying drawings in which.

DESCRIPTION OF PREFERRED EMBODIMENT

Figure 4:
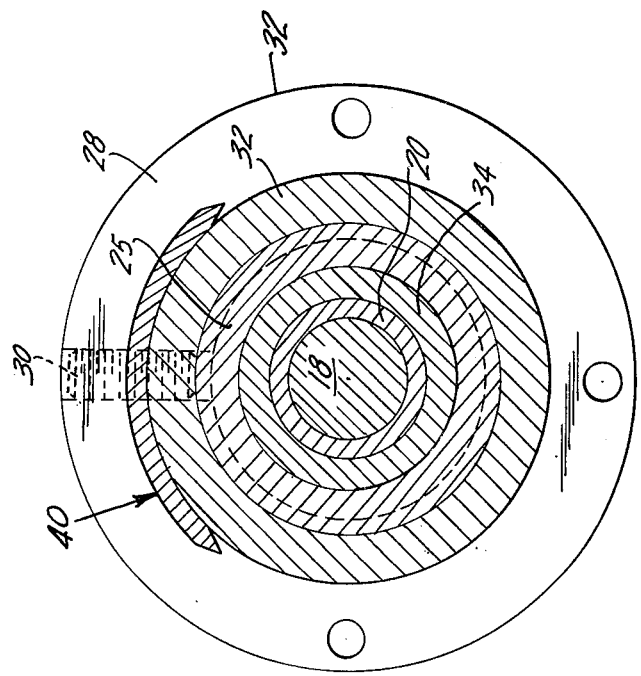
FIG. 4 is a cross-sectional view of the spring clutch of the instant invention taken substantially along line 4—4 of FIG. 1.

Referring now to the drawings, the spring clutch of this invention is generally designated by the reference number 10 and comprises an output drum member 12, an input drum member 24 and a helical clutch spring 40.

Figure 1:
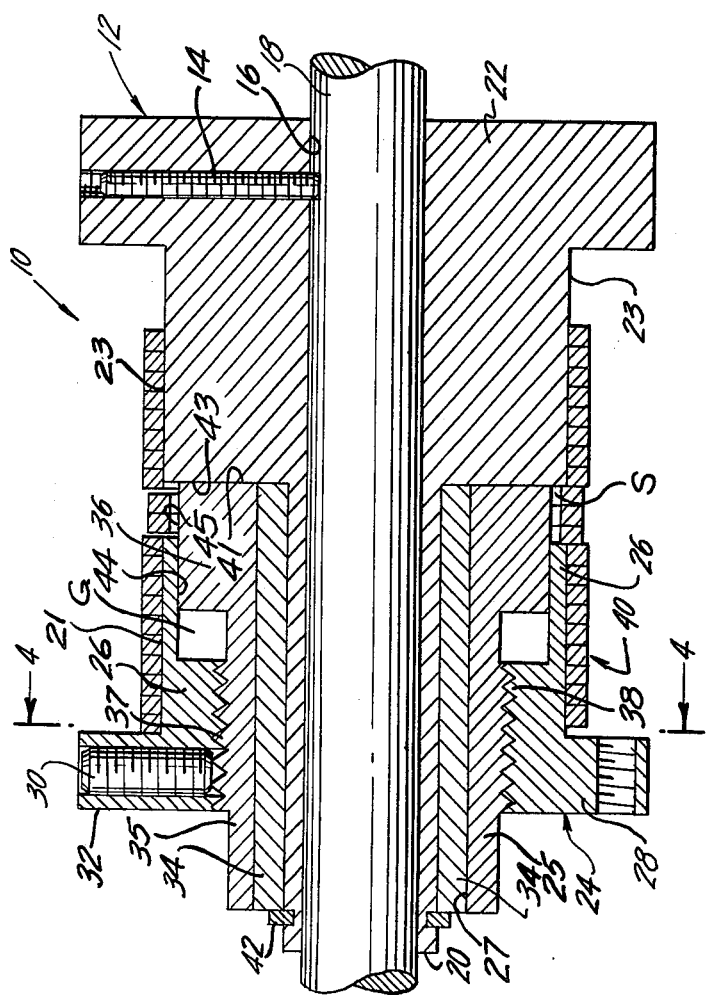
FIG. 1 is a longitudinal sectional view of the spring clutch of the instant invention showing a coil spring positioned on the clutch drums.

The output drum member 12 has an axial bore 16 for receiving therethrough an output shaft 18 and a reduced diameter portion 20, the larger diameter portion 22 having a peripheral clutching surface 23. The output drum member 12 is secured for conjoined rotation with output shaft 18 by any suitable means, such as a key, or as shown in FIG. 1, a set screw 14.

The input drum member 24 comprises a sleeve-like part 25 and an adjustable means in the form of a collar 32. The sleeve-like part 25 has a large diameter portion 36 and an axially extending reduced diameter portion 35. An axial bore 26 is provided in sleeve-like part 25 in which is secured a sleeve bearing 34 and in which is receivable reduced diameter portion 20 of output drum member 12 for supporting sleeve-like part 25 of input drum member 24 for rotation relative to output drum member 12. The reduced diameter portion 35 is provided with an externally threaded portion 37 to receive the threaded bore 38 of collar 32 which permits, by turning the collar 32 on the threaded portion 37 of sleeve-like part 25, axial movement of the collar relative to the sleeve-like part and output drum member 12. The purpose of this relative axial positioning of collar 32 will become apparent hereinafter. The collar 32 also has a flanged portion 28 and an axially extending hub portion 26 the outer periphery of which provides a clutch surface 21. The diameter of peripheral clutch surface 21 is substantially the same as peripheral clutch surface 23 of output drum member 12 so that clutch surfaces 23 and 21 are substantially coextensive. The input drum member 24 is secured in a desired axial position relative to output drum member 12 by a retaining ring 42 disposed in an annulus in the outer peripheral surface of reduced diameter portion 20 of output drum member 12. Preferably, input drum member 24 is secured relative to output drum 12 so that the end surface 41 of large diameter portion 36 of input drum member 24 is in close running relationship with the shoulder 43 formed between portion 22 and reduced diameter portion 20 of output drum member 12. To provide for reciprocative rotation of input drum member 24, it is connected to a source of reciprocative power (not shown) through any suitable connecting means, as for example, bolting flange portion 28 of collar 32 to a flange (not shown) of a driveshaft (not shown).

The collar 32 is axially adjusted on sleeve-like member 36 by rotating collar 32 on threaded portion 37 so that the distal end of hub portion 26 is axially spaced from the shoulder 43 of portion 22 to form an annular cross-over gap or slot S. The width of slot S is determined by the amount of angular rotation of the input member 24 relative to output drum member 12 that is desired or expressed another way, the predetermined amount of lost motion desired between the input and output drum members.

The helical clutch spring 40 is coaxially disposed around the input drum member 24 and output drum member 12 so as to span the cross-over gap or slot S. The clutch spring is connected to the input and output drum members to grip the clutch surfaces 23 and 21 for transmitting torque from the input drum member 24 to output drum member 12. Preferably, clutch spring 40 is so dimensioned in the relaxed state that when assembled on the input and output drum members, it is elastically preloaded about clutch surfaces 23 and 21.

Figure 2:
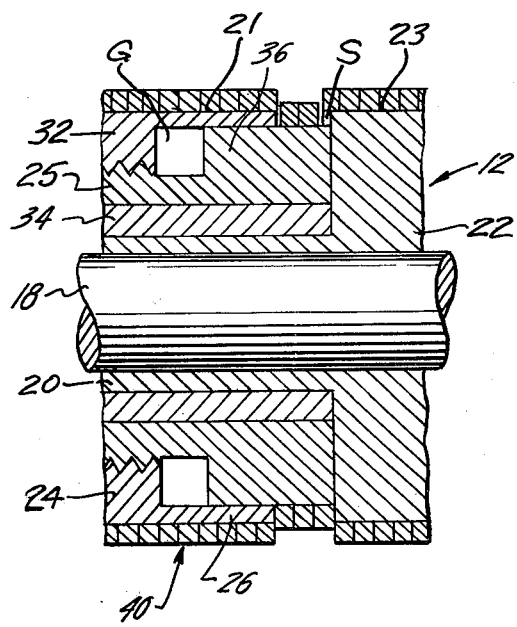
FIG. 2 is a longitudinal fragmentary cross-sectional view of the spring clutch of the instant invention showing the position of the coil spring when the output clutch drum is being driven by the input clutch drum through a predetermined arc.

The spring clutch 10 is specifically for application wherein the input drum member 24 is reciprocated through a predetermined arc, for example 60°, to drive output drum member 12 intermittently in one direction of rotation in arcuate increments. Thus, in operation of spring clutch 10 when the input drum member 24 commences to rotate in a direction to contract the coils of clutch spring 40 upon clutch surface 21, the coils of the clutch spring spanning slot S are, as shown in FIG. 1, slightly contracted in slot S. With further rotation of input clutch drum 24 and under the torque forces, the coils spanning slot S are more fully contracted into slot S until seated to a position gripping the bottom surface 45 of slot S before torque is transmitted to the coils of spring 40 gripping clutch surface 23 of output drum member 12. The time delay in torque transmission between input drum member 24 and output drum member 12 by reason of this necessity for the spring coils to contract into slot S before rotation of output drum member is effected, results in arcuate movement of output drum member 12 of less than the arcuate movement of input drum member 24, as for example, between 10° and 55°, depending upon the width of slot S. The rotation of the output drum member 12 effects rotation of output shaft 18 through the same arcuate distance that the output drum member is driven. During the reverse rotation of input drum member 24, the output drum member 12 remains stationary since such rotation is opposite to the "hand" of the helix of clutch spring 40 and the coils of spring 40 which, as shown in FIG. 2, are gripping or seated in the bottom of slot S, are expanded to the position as shown in FIG. 1 and thereafter expanded further, until the stored energy becomes equal to the over-running drag which occurs between the coils of the spring 40 and clutch surface 21 to the position shown in FIG. 3. The distance of the wrapping or contraction of the coils into slot S which is measured from the expanded position shown in FIG. 3 is the total lost motion which, in turn, determines how far output drum member 12 is arcuately driven.

The clutch of the instant invention is specifically for application wherein the input drum member 24 is connected to a source of power, not shown, to reciprocate the input drum member 24 through a predetermined arc, such as 60°, and the output drum is to be driven intermittently in one direction in arcuate increments. When input drum 24 commences to rotate in the direction to contract the coils of the output drum 12, the coils of the spring 40 that are initially positioned over and are slightly contracted within the slot S and are in interference fit with surfaces 23 and 21, as shown in FIG. 1, wrap down into the slot until they become solidly seated within the slot S, as shown in FIG. 2. This requires a certain degree of travel of the coils as predetermined by the width and depth of the slot. When the coils become solidly seated as shown in FIG. 2, the output drum is then driven since the takeup of the coils of the spring 40 has been achieved and, therefore, torque is transmitted via the gripping engagement of the coils of spring clutch 40 on clutch surface 23 of the output drum 12. This drives the output drum 12 and thereby output shaft 18 to a predetermined arcuate distance. During the reverse rotative movement of the input drum 24, during which the output drum remains stationary, the coils of the helical spring 40, that are now within the slot S, first relax to their natural state, shown in FIG. 1, and then expand further until their stored energy becomes equal to the over-run drag that occurs due to the interference fit of the spring coils on the surfaces 23 and 21 as shown in FIG. 3. By reducing or increasing the width of the slot S, by means of the adjusting collar 32, and thereby the number of coils over the slot S, the amount of lost motion is controlled and thereby the degree of arcuate movement of the output drum member 12 is controlled up to but not exceeding the degree of movement of the input drum member 24. An arc of travel of the output drum 12 of from 10° to 55° is normally contemplated.

Figure 3:
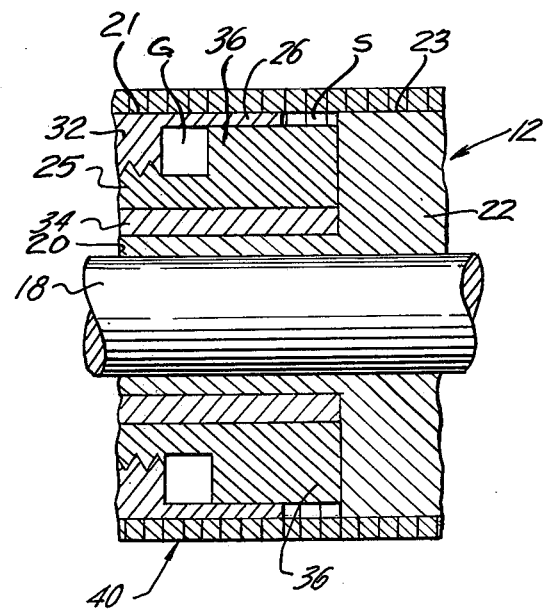
FIG. 3 is a longitudinal fragmentary sectional view of the spring clutch of the instant invention, similar to FIG. 2, showing the position of the coil spring when the input clutch drum has reached the limit of its reverse rotation and the output drum is stationary.

As is seen in FIGS. 1 to 3, the collar is preferably provided with an axial recess 44 dimensioned to slidably receive therein enlarged portion 36 of part 25 so that the collar is provided with support. A gap G is provided between the bottom of recess 44 and enlarged portion 36 in order that the collar 32 has the requisite freedom of axial movement for adjusting the width of the slot S between the two extreme limits of adjustment. The selected position of collar 32 is fixed by set screw 30 or other suitable means. The depth of the slot S is initially predetermined by the design requirements of the clutch and its components which provides for the basic structure of the clutch.

It is thus seen that the instant invention provides a helical spring clutch of the type to provide intermittent arcuate output in one direction wherein such arcuate output is readily and easily adjustable during assembly or in the field. It is a spring clutch in which the desired arcuate degree of incremental movement of the output drum member can be maintained constant by adjustments compensating for wear throughout the operative life of the spring clutch. Although the foregoing describes the input as being drum member 24, naturally the reverse may be readily achieved, that is, input may be achieved through the drum member 12 and output through the drum member 24 by mere variation of the external drive mechanism associated with the spring clutch, as is readily apparent.

The instant invention will become more readily apparent from the following illustrative example:

Using 0.062 inch square wire on 2 inch diameter input and output drums, and a reciprocating input angle of 150° and slot depth of 0.060 inch with an interference fit of 0.20 inch (diametral) between the coil spring inside diameter and the 2 inch diameter input and output clutch drums let:

$$\phi = \frac{(I.F.) N \times 360°}{Dm} = \frac{.120 \times 1 \times 360°}{2.062} = 20.9°$$

where:

$\phi$ = the lost motion angle (difference between input drum and output drum arc)
I.F. = interference fit
N = number of spring coils over the slot
Dm = mean diameter of the coil spring The above states that for every spring coil that wraps down into the slot that the output drum will rotate 20.9 less than the input drum. It is also seen that if the I.F. is reduced the $\phi$ is accordingly reduced. If it is desirable to have $\phi$ a minimum of 7° then the I.F. would have to be a maximum of 0.040 inch. Also, if the Dm increases, $\phi$ decreases and, therefore, by proper design of the I.F. the Dm and the adjustable N, a very small or very large differential angle between the input and the output can be attained.

It should be understood that this invention is not limited to the specific details of the construction herein illustrated and that changes and modifications may occur to one skilled in the art without departing from the spirit or scope of the invention.

What is claimed is:

1. An adjustable spring clutch of the type to provide an intermittent rotary output in one direction comprising:
    (a) an input clutch drum supported for reciprocal rotation and connected to a source of reciprocative rotative power so as to be driven by the latter, first in one direction and then the other;
    (b) an output clutch drum supported for rotation independent of said input drum so that the input and output drums are free to rotate relative to each other;
    (c) said input clutch drum and output clutch drum being constructed and supported to provide an annular gap between said input and output drums;
    (d) a coil spring positioned coaxially with respect to said input and output clutch drums and spanning said gap and being connected to said input and output drums for gripping said input and output drums; and
    (e) adjustable means for varying the size of said annular gap and thereby vary the amount of relative rotative movement between said input drum and output drum before torque is transmitted from the input drum to the output drum.

2. The spring clutch of claim 1 wherein said adjustable means defines one part of the gap and is axially movable to vary the width of said gap.

3. The apparatus of claim 1 wherein said input drum includes a first part and said adjustable means and wherein said adjustable means includes a collar which is axially movable relative to the first part and said output drum to vary the width of the annular gap.

4. The apparatus of claim 3 wherein said collar is threadably connected to said first part and by rotation is moved axially relative to said first part and said output drum.

5. The apparatus of claim 3 wherein said output drum has an outer peripheral surface portion which provides a first clutch surface which a portion of the coil spring engages and wherein said collar has an outer peripheral surface portion which provides a second clutch surface which another portion of the coil spring engages.

6. The apparatus of claim 5 wherein said coil spring portions are in interference fit with said first and second clutch surfaces.

7. The apparatus of claim 1 wherein said coil spring is in interference fit with the input and output drums and where the coils of said spring spanning said gap are free to contract into said gap during one direction of the rotation of the input drum and expand out of said gap during the opposite direction of rotation of the input drum thereby respectively delaying torque transmission from the input drum to the output drum and maintaining said output drum in a substantially stationary position.

8. The apparatus of claim 1 wherein said output drum is supported on and is connected to a shaft for conjoined rotation therewith and wherein said input drum is supported and journaled for rotation on the output drum.

* * * * *